United States Patent
Nie

(10) Patent No.: US 10,826,849 B2
(45) Date of Patent: Nov. 3, 2020

(54) METHOD AND SYSTEM FOR UPLOADING DATA TO CLOUD PLATFORM, GATEWAY, AND MACHINE-READABLE MEDIUM

(71) Applicant: Siemens Aktiengesellschaft, Munich (DE)

(72) Inventor: Kun Nie, QingDao (CN)

(73) Assignee: Siemens Aktiengesellschaft, Munich (DE)

( * ) Notice: Subject to any disclaimer, the term of this patent is extended or adjusted under 35 U.S.C. 154(b) by 189 days.

(21) Appl. No.: 16/033,315

(22) Filed: Jul. 12, 2018

(65) Prior Publication Data

US 2019/0036846 A1    Jan. 31, 2019

(30) Foreign Application Priority Data

Jul. 31, 2017   (CN) .......................... 2017 1 0641944

(51) Int. Cl.
*H04L 12/861* (2013.01)
*H04L 29/08* (2006.01)
*H04L 12/66* (2006.01)
*H04L 29/06* (2006.01)

(52) U.S. Cl.
CPC .............. *H04L 49/90* (2013.01); *H04L 12/66* (2013.01); *H04L 67/06* (2013.01); *H04L 67/10* (2013.01); *H04L 67/108* (2013.01); *H04L 69/166* (2013.01)

(58) Field of Classification Search
None
See application file for complete search history.

(56) References Cited

U.S. PATENT DOCUMENTS

| 6,564,267 B1 * | 5/2003 | Lindsay | H04L 29/06 370/465 |
| 6,570,849 B1 * | 5/2003 | Skemer | H04L 12/2856 370/230.1 |
| 2014/0355624 A1 * | 12/2014 | Li | H04N 21/631 370/468 |
| 2015/0055467 A1 * | 2/2015 | Agarwal | H04L 47/781 370/232 |
| 2015/0298315 A1 * | 10/2015 | Shick | G06N 3/008 700/246 |
| 2017/0041248 A1 * | 2/2017 | Toy | H04B 10/272 |
| 2017/0279738 A1 * | 9/2017 | Cai | H04L 67/10 |
| 2018/0083982 A1 * | 3/2018 | Asenjo | H04L 63/20 |

OTHER PUBLICATIONS

Extended European Search Report dated Nov. 8, 2018.

* cited by examiner

*Primary Examiner* — Dhairya A Patel
(74) *Attorney, Agent, or Firm* — Harness, Dickey & Pierce, P.L.C.

(57) ABSTRACT

Provided are a method and a system for uploading data to a cloud platform, a gateway, and a machine-readable medium. In an embodiment, the method includes: receiving, by a gateway, at least two items of to-be-uploaded data from at least one data transmitting device; segmenting, by the gateway, the at least two items of to-be-uploaded data into at least two data blocks, each data block including at least one item of to-be-uploaded data; and uploading, by the gateway, the to-be-uploaded data included in the at least two data blocks to the cloud platform in a concurrent manner. Embodiments of the present solution can conveniently maintain a gateway.

9 Claims, 6 Drawing Sheets

METHOD AND SYSTEM FOR UPLOADING DATA TO CLOUD PLATFORM, GATEWAY, AND MACHINE-READABLE MEDIUM

PRIORITY STATEMENT

The present application hereby claims priority under 35 U.S.C. § 119 to Chinese patent application number CN 201710641944.0 filed Jul. 31, 2017, the entire contents of which are hereby incorporated herein by reference.

FIELD

At least one embodiment of the present invention generally relates to the technical field of communications, and more particularly to a method and/or a system for uploading data to a cloud platform, a gateway, and/or a machine-readable medium.

BACKGROUND

A cloud platform provides a virtualized computing resource sharing pool, and has powerful data storage capability and data processing capability. The cloud platform is applied as an industrial cloud platform in the industrial fields. By deploying different application programs on the industrial cloud platform, monitoring, control and other work in an industrial production process may be performed on the industrial cloud platform, for ease of centralized management on the industrial production process.

The industrial cloud platform manages the industrial production process based on data uploaded by various industrial devices, such as a temperature value uploaded by a temperature sensor and a revolving speed value uploaded by a revolving speed sensor. Because the industrial devices and the industrial cloud platform may have different communication protocols, data formats and languages, a gateway is required to upload data from the industrial devices to the industrial cloud platform.

At present, a gateway is connected with one or more industrial devices, and is responsible for transmitting data uploaded by the connected industrial devices to the industrial cloud platform.

SUMMARY

For the current method for uploading data from an industrial device to an industrial cloud platform, a great number of industrial devices are required to cooperatively complete a same industrial production process, and each gateway can only be connected with a limited number of industrial devices, so multiple gateways are required to connect various industrial devices to the industrial cloud platform, resulting in the presence of a greater number of gateways. The inventors have recognized that the presence of a greater number of gateways makes it greatly inconvenient to maintain the gateways.

In view of this, at least one embodiment of the present invention provides a method and a system for uploading data to a cloud platform, a gateway, and a machine-readable medium, capable of conveniently maintaining the gateway.

According to a first aspect, an embodiment of the present invention provides a method for uploading data to a cloud platform. After receiving at least two items of to-be-uploaded data from at least one data transmitting device, a gateway segments each item of to-be-uploaded data into at least two data blocks, so that each data block includes at least one item of to-be-uploaded data, and the to-be-uploaded data included in each data block is uploaded to the cloud platform in a concurrent manner.

According to a second aspect, an embodiment of the present invention also provides a gateway, including:

a data receiving module, configured to receive at least two items of to-be-uploaded data from at least one data transmitting device;

a data segmenting module, configured to segment the at least two items of to-be-uploaded data received by the data receiving module into at least two data blocks, each data block including at least one item of to-be-uploaded data; and a data uploading module, configured to upload the to-be-uploaded data included in the at least two data blocks segmented by the data segmenting module to a cloud platform in a concurrent manner.

According to a third aspect, an embodiment of the present invention also provides a gateway, including: at least one memory and at least one processor, wherein the at least one memory is configured to store a machine-readable program; and the at least one processor is configured to call the machine-readable program to execute the method provided according to the first aspect or any one possible implementation of the first aspect.

According to a fourth aspect, an embodiment of the present invention also provides a system for uploading data to a cloud platform, including: any one gateway provided according to the second aspect, any one implementation of the second aspect, the third aspect, or any one implementation of the third aspect, at least one data transmitting device, and a cloud platform, wherein each data transmitting device is configured to transmit to-be-uploaded data to the gateway; and the cloud platform is configured to receive the to-be-uploaded data uploaded by the gateway.

According to a fifth aspect, an embodiment of the present invention also provides a machine-readable medium. The machine-readable medium stores a computer instruction. When executed by a processor, the computer instruction enables the processor to execute the method provided according to the first embodiment or any one possible implementation of the first embodiment.

Figure 1:
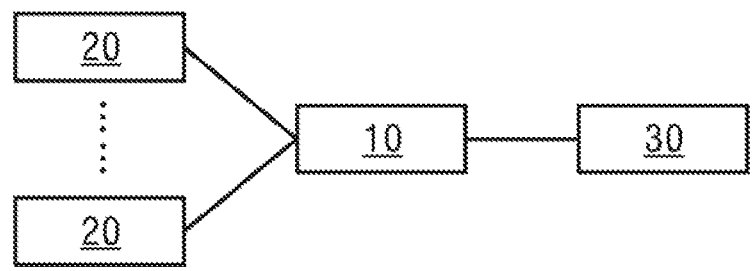
FIG. 1 is a schematic diagram of a system for uploading data to a cloud platform according to an embodiment of the present invention.

| Drawing reference sign list: | | |
|---|---|---|
| 10: Gateway | 20: Data transmitting device | 30: Cloud platform |
| 101: Data receiving module | 102: Data segmenting module | 103: Data uploading module |
| 104: Creation module | 105: Message queue | 1021: First data segmenting unit |
| 1022: Data capacity detecting unit | 1023: Second data segmenting unit | 1001: Memory |
| 1002: Processor | | |
| 401: A gateway receives to-be-uploaded data | | |
| 402: The gateway segments the to-be-uploaded data into at least two data blocks | | |
| 403: The gateway uploads the to-be-uploaded data included in the data blocks to a cloud platform in a concurrent manner | | |
| 501: Segment to-be-uploaded data into a first data block according to receiving time | | |
| 502: Detect whether the capacity of the first data block is greater than a capacity threshold | | |
| 503: Segment the first data block into multiple second data blocks as data blocks | | |
| 504: Take the first data block as a data block | | |
| 601: Divide a segmentation cycle into two successive segmentation sub-cycles equal in time length | | |
| 602: Segment to-be-uploaded data received within each segmentation sub-cycle into a third data block | | |
| 603: Detect whether the capacity of the third data block is greater than a capacity threshold | | |
| 604: Take the segmentation sub-cycle as the segmentation cycle | | |
| 605: Take the third data block as a second data block | | |
| 701: Pre-create a message queue | | |
| 702: Transmit to-be-uploaded data included in each data block to a corresponding message queue in a concurrent manner | | |
| 1201: A gateway receives to-be-uploaded data from each data transmitting device | | |
| 1202: The gateway segments the received to-be-uploaded data into multiple data blocks | | |
| 1203: The gateway transmits the to-be-uploaded data included in each data block to a corresponding message queue in a concurrent manner | | |
| 1204: The message queue transmits the to-be-uploaded data to a corresponding data subscription module | | |
| 1205: The data subscription module transmits the to-be-uploaded data to a data processing module on a cloud platform | | |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first aspect, an embodiment of the present invention provides a method for uploading data to a cloud platform. After receiving at least two items of to-be-uploaded data from at least one data transmitting device, a gateway segments each item of to-be-uploaded data into at least two data blocks, so that each data block includes at least one item of to-be-uploaded data, and the to-be-uploaded data included in each data block is uploaded to the cloud platform in a concurrent manner.

Because the cloud platform can segment the received to-be-uploaded data into multiple data blocks, and the to-be-uploaded data included in each data block can be uploaded to the cloud platform in a concurrent manner, the gateway is able to process mass data. A same gateway may upload to-be-uploaded data transmitted by multiple data transmitting devices to the cloud platform, so that the total number of gateways may be reduced during the process of uploading data to the cloud platform, thereby making it convenient to maintain the gateways.

Optionally, in an embodiment, when at least two received items of to-be-uploaded data are segmented into at least two data blocks, at least one item of to-be-uploaded data received within a same preset segmentation cycle is segmented into a first data block according to receiving time for each item of to-be-uploaded data, and whether the capacity of each first data block is greater than a preset capacity threshold is separately detected. If the capacity of a first data block is greater than the capacity threshold, the first data block is segmented into at least two second data blocks, so that the capacity of each second data block is smaller than or equal to the capacity threshold, and each second data block is taken as a data block for subsequent concurrent processing. If the capacity of a first data block is smaller than or equal to the capacity threshold, the first data block is taken as a data block for subsequent concurrent processing.

A segmentation cycle of a specific time length is preset, and to-be-uploaded data received within each segmentation cycle is segmented into a first data block. Because to-be-uploaded data uploaded by various data transmitting devices in different time periods has different data sizes, to-be-uploaded data received by a gateway within different segmentation cycles has different data sizes. In order to avoid affecting a concurrent uploading speed due to the over-large capacity of a data block, if the capacity of a first data block is smaller than or equal to a preset capacity threshold, the first data block is directly taken as a data block for subsequent concurrent uploading processing; and if the capacity of a first data block is greater than the preset capacity threshold, the first data block is segmented into at least two second data blocks having the capacity smaller than or equal to the capacity threshold, and each second data block is taken as a data block for subsequent concurrent uploading processing.

Optionally, in an embodiment, when the capacity of a first data block exceeds a preset capacity threshold and the first data block needs to be segmented into multiple second data blocks, a segmentation cycle corresponding to the first data block is divided into two successive segmentation sub-cycles equal in time length, to-be-uploaded data received within each segmentation sub-cycle is segmented into a third data block, if the capacity of the third data block is still greater than the capacity threshold, the segmentation sub-cycle is divided again as a segmentation cycle until the capacity of the third data block is smaller than or equal to the capacity threshold, and the third data block is taken as a second data block.

When the first data block needs to be segmented, a preset segmentation cycle is first divided into two successive segmentation sub-cycles equal in time length, if the data size of to-be-uploaded data received within a segmentation sub-cycle is still greater than the capacity threshold, the segmentation sub-cycle is divided into two successive segmentation sub-cycles equal in time length again, and this process is repeated until the capacity of data blocks of the to-be-uploaded data received within each cycle is smaller than or equal to the capacity threshold. By way of a sliding-time window method for dividing a segmentation cycle, to-be-uploaded data may be accurately segmented, so it is ensured that the data size of each data block is smaller than or equal to a capacity threshold, thereby ensuring the speed and reliability of concurrent data uploading.

Optionally, in an embodiment, a corresponding message queue is pre-created for each data transmitting device, and the message queue can accept a subscription from at least one data subscription module on the cloud platform, and transmit the received to-be-uploaded data to each data subscription module subscribing the data. When the to-be-uploaded data included in each data block is uploaded to the cloud platform in a concurrent manner, at least two data blocks are processed simultaneously in a concurrent manner. For each item of to-be-uploaded data included in each data block, a device identity (ID) carried in the to-be-uploaded data is acquired, wherein the device ID is used for identifying a data transmitting device uploading the to-be-uploaded data, and the to-be-uploaded data is further transmitted to a message queue corresponding to a same data transmitting device as the carried device ID.

The to-be-uploaded data uploaded by each data transmitting device carries a device ID of the data transmitting device. According to the device ID carried in an item of to-be-uploaded data, the to-be-uploaded data may be transmitted to a same data transmitting device as the carried device ID. The message queue adopts a publishing/subscription mechanism. Each message queue accepts a subscription from one or more data subscription modules on the cloud platform, and transmits the received to-be-uploaded data to each data subscription module subscribing the data. Transmission of to-be-uploaded data to multiple data subscription modules on the cloud platform through multiple message queues not only ensures the speed of uploading to-be-uploaded data via the gateway, but also realizes classified uploading of to-be-uploaded data, for ease of to-be-uploaded data processing of the cloud platform.

Optionally, in an embodiment, during the process of receiving, by each message queue, to-be-uploaded data and transmitting the to-be-uploaded data to each data subscription module subscribing the to-be-uploaded data, whether the usage rate of each message queue exceeds a preset usage rate threshold is detected. If yes, a message queue corresponding to a same data transmitting device as this message queue is created. Correspondingly, when to-be-uploaded data is transmitted to a message queue, according to a device ID carried in the to-be-uploaded data, the number of message queues corresponding to a same data transmitting device as the device ID is acquired. If there is one message queue, the to-be-uploaded data is directly uploaded to this message queue. If the number of acquired message queues is greater than 1, the to-be-uploaded data is transmitted to a message queue having a lowest usage rate in the various acquired message queues.

Because to-be-uploaded data uploaded by data transmitting devices in different time periods has different data sizes, a corresponding message queue is pre-created for each data transmitting device. If the data size of data uploaded by a data transmitting device within a certain time period is larger, the usage rate of a corresponding message queue may exceed the preset usage rate threshold. In order to prevent to-be-uploaded data from overflowing due to the over-high usage rate of a message queue, after the usage rate of a message queue exceeds a usage rate threshold, a message queue corresponding to a same data transmitting device as this message queue is created. Thus, one data transmitting device is corresponding to multiple message queues, and to-be-uploaded data uploaded by the data transmitting device is transmitted to a corresponding message queue having the lowest usage rate, thereby ensuring that to-be-uploaded data uploaded by each data transmitting device can be uploaded to the cloud platform through the message queues, preventing loss of the to-be-uploaded data in an uploading process, and ensuring the safety and reliability of uploading data to the cloud platform.

According to a second aspect, an embodiment of the present invention also provides a gateway, including:

a data receiving module, configured to receive at least two items of to-be-uploaded data from at least one data transmitting device;

a data segmenting module, configured to segment the at least two items of to-be-uploaded data received by the data receiving module into at least two data blocks, each data block including at least one item of to-be-uploaded data; and a data uploading module, configured to upload the to-be-uploaded data included in the at least two data blocks segmented by the data segmenting module to a cloud platform in a concurrent manner.

The data segmenting module can segment each item of to-be-uploaded data received by the data receiving module into multiple data blocks, and the data uploading module can upload the to-be-uploaded data included in each data block to the cloud platform in a concurrent manner. Because the data uploading module can upload data to the cloud platform in a concurrent manner, the gateway is able to process mass data. A same gateway may be connected with multiple data transmitting devices, so that the total number of gateways may be reduced, thereby making it convenient to maintain the gateways.

Optionally, in an embodiment, the data segmenting module includes:

a first data segmenting unit, configured to segment at least one item of to-be-uploaded data received within a same preset segmentation cycle into a first data block according to receiving time for each item of to-be-uploaded data;

a data capacity detecting unit, configured to detect, for each first data block segmented by the first data segmenting unit, whether the capacity of the first data block is greater than a preset capacity threshold; and a second data segmenting unit, configured to segment, if a detection result of the data capacity detecting unit is yes, the first data block into at least two second data blocks so that the capacity of each second data block is smaller than or equal to the capacity threshold, and take each second data block as a data block, and take, if no, the first data block as a data block.

The data capacity detecting unit detects the capacity of each first data block segmented by the first data segmenting unit, and if a detection result of the data capacity detecting unit indicates that the capacity of the first data block is greater than a preset capacity threshold, the second data segmenting unit segments the first data block into at least two second data blocks so that the capacity of each second data block is smaller than or equal to the capacity threshold, and subsequently processes the segmented second data block as a data block. Because to-be-uploaded data uploaded by various data transmitting devices in different time periods has different capacities, by detecting the capacity of the first data block and segmenting the first data block having the capacity greater than the capacity threshold again, it is ensured that the capacity of each data block for concurrent uploading is smaller than or equal to the capacity threshold, so as to prevent from affecting the concurrent uploading speed due to the over-large capacity of the data block.

Optionally, in an embodiment, the second data segmenting unit is configured to divide, when the data capacity detecting unit detects that the capacity of the first data block is greater than the capacity threshold, the segmentation cycle corresponding to the first data block into two successive segmentation sub-cycles equal in time length, segment the to-be-uploaded data received within a same segmentation sub-cycle into a third data block, detect, for each third data block, whether the capacity of the third data block is greater than the capacity threshold, take, if yes, the segmentation sub-cycle as the segmentation cycle to execute the operation of dividing the segmentation cycle into two successive segmentation sub-cycles equal in time length, and take, if no, the third data block as one second data block.

When segmenting the first data block, the second data segmenting unit first divides a segmentation cycle corresponding to the first data block into two successive segmentation sub-cycles equal in time length, and segments to-be-uploaded data received within a same segmentation sub-cycle into a third data block. If the capacity of the third data block is still greater than the capacity threshold, the segmentation sub-cycle is divided again by using the same division method until the capacity of to-be-uploaded data received within the divided cycle is smaller than or equal to the capacity threshold. The second data segmenting unit divides a segmentation cycle, so it is ensured that the capacity of each data block is smaller than or equal to the capacity threshold, thereby ensuring the speed and reliability of concurrent data block uploading processing.

Optionally, in an embodiment, the gateway further includes: a creation module, configured to pre-create a corresponding message queue for each data transmitting device, the message queue being used for accepting a subscription from at least one data subscription module on the cloud platform, and transmitting the received to-be-uploaded data to the at least one data subscription module subscribing the data.

The data uploading module is configured to execute, on each data block in the at least two data blocks, the following operation simultaneously in a concurrent manner: acquiring, for each item of to-be-uploaded data included in the data block, a device ID carried in the to-be-uploaded data, and transmitting the to-be-uploaded data to the message queue corresponding to a same data transmitting device as the device ID, the device ID being used for identifying the data transmitting device transmitting the to-be-uploaded data.

The data uploading module processes multiple data blocks simultaneously in a concurrent manner, and transmits, according to a device ID carried in to-be-uploaded data included in each data block, the to-be-uploaded data to a corresponding message queue, so the message queue transmits, through a publishing/subscription mechanism, the received to-be-uploaded data to each data subscription module subscribing the data, thereby uploading to-be-uploaded data to the cloud platform. A publishing/subscription mechanism not only may transmit to-be-uploaded data to the cloud platform through multiple message queues to ensure that the gateway is able to process mass data, but also may realize classified uploading of to-be-uploaded data, for ease of to-be-uploaded data processing of the cloud platform.

Optionally, in an embodiment, the creation module is further configured to respectively detect whether the usage rate of each message queue exceeds a preset usage rate threshold, and create, if yes, a message queue corresponding to a same data transmitting device as the present message queue.

The data uploading module is configured to judge whether there is one message queue corresponding to a same data transmitting device as a device ID, transmit, if yes, the to-be-uploaded data to the message queue corresponding to the same data transmitting device as the device ID, and transmit, if no, the to-be-uploaded data to one message queue having a lowest usage rate in the various message queues corresponding to the same data transmitting device as the device ID.

The creation module detects the usage rate of each message queue, and creates, after the usage rate of a message queue exceeds the preset usage rate threshold, a message queue corresponding to the same data transmitting device as this message queue again. When transmitting to-be-uploaded data to a message queue, if there are multiple message queues corresponding to a same data transmitting device as a device ID carried in the to-be-uploaded data, the data uploading module transmits the to-be-uploaded data to a message queue having the lowest usage rate. The creation module creates a new message queue according to the usage rate of message queues, and the data uploading module transmits to-be-uploaded data to a message queue having the lowest usage rate in corresponding message queues, thereby preventing to-be-uploaded data from overflowing due to the over-high usage rate of the message queue, ensuring that to-be-uploaded data uploaded by each data transmitting device can be uploaded to the cloud platform through the message queues, preventing loss of the to-be-uploaded data in an uploading process, and ensuring the safety and reliability of uploading data to the cloud platform.

According to a third aspect, an embodiment of the present invention also provides a gateway, including: at least one memory and at least one processor, wherein the at least one memory is configured to store a machine-readable program; and the at least one processor is configured to call the machine-readable program to execute the method provided according to the first aspect or embodiment or any one possible implementation of the first aspect or embodiment.

The memory stores a machine-readable program, and the processor may execute, by calling the machine-readable program stored in the memory, the method provided according to the first aspect or embodiment or any one possible implementation of the first aspect or embodiment. After each item of to-be-uploaded data is segmented into multiple data blocks, the to-be-uploaded data included in each data block is uploaded to a cloud platform in a concurrent manner. Therefore, a gateway is able to process mass data. A same gateway may process to-be-uploaded data transmitted by multiple data transmitting devices, so that the number of gateways required for uploading data to the cloud platform is reduced, thereby making it convenient to maintain the gateways.

According to a fourth aspect, an embodiment of the present invention also provides a system for uploading data to a cloud platform, including: any one gateway provided according to the second aspect or embodiment, any one implementation of the second aspect or embodiment, the third aspect or embodiment, or any one implementation of the third aspect or embodiment, at least one data transmitting device, and a cloud platform, wherein each data transmitting device is configured to transmit to-be-uploaded data to the gateway; and the cloud platform is configured to receive the to-be-uploaded data uploaded by the gateway.

Each data transmitting device transmits to-be-uploaded data to the gateway, and after segmenting each of the received items of to-be-uploaded data into multiple data blocks, the gateway transmits the to-be-uploaded data included in each data block to the cloud platform in a concurrent manner. Because the gateway uploads the to-be-uploaded data included in the data block to the cloud platform in a concurrent manner, the gateway is able to process mass data. A same gateway may be connected with multiple data transmitting devices, so that the total number of gateways may be reduced, thereby making it convenient to maintain the gateways.

Optionally, in an embodiment, the gateway is disposed on the cloud platform.

The gateway is disposed on the cloud platform, and each data transmitting device is connected to the gateway. Because the gateway is disposed on the cloud platform, an administrator of a data transmitting device can only control the data transmitting device to transmit data to the gateway, but cannot disturb the data processing of the gateway, so that the safety of uploading data from the gateway to the cloud platform may be improved.

Optionally, in an embodiment, the cloud platform includes at least one data subscription module, wherein each data subscription module subscribes data for at least one message queue in the gateway, and receive the subscribed to-be-loaded data transmitted by the at least one message queue.

The cloud platform is provided with multiple data subscription modules, wherein each data subscription module may subscribe data for one or more message queues in the gateway, and after receiving to-be-loaded data transmitted by the message queue, the data subscription module transmits the received to-be-loaded data to a corresponding data processing module or data storage module on the cloud platform, thereby making it convenient for the cloud platform to further process to-be-loaded data.

According to a fifth aspect, an embodiment of the present invention also provides a machine-readable medium. The machine-readable medium stores a computer instruction. When executed by a processor, the computer instruction enables the processor to execute the method provided according to the first aspect or embodiment or any one possible implementation of the first aspect or embodiment.

The machine-readable medium stores a computer instruction. When executing the computer instruction, the processor may execute the method for uploading data to a cloud platform provided according to the first aspect or embodiment or any one possible implementation of the first aspect or embodiment. After each item of to-be-uploaded data is segmented into multiple data blocks, the to-be-uploaded data included in each data block is uploaded to a cloud platform in a concurrent manner. Therefore, a gateway is able to process mass data. A same gateway may process to-be-uploaded data transmitted by multiple data transmitting devices, so that the number of gateways required for uploading data to the cloud platform is reduced, thereby making it convenient to maintain the gateways.

As previously mentioned, when a current industrial device uploads data to an industrial cloud platform, each gateway can only be connected with a limited number of industrial devices due to the limitation of data processing capability of the gateway, and a great number of industrial devices are required to cooperatively complete a same industrial production process, so a great number of gateways are required to connect various industrial devices to the cloud platform. The presence of a greater number of gateways makes it greatly inconvenient to maintain the gateways.

In the embodiments of the present invention, after receiving to-be-uploaded data transmitted by multiple data transmitting devices, a same gateway segments each of the received items of to-be-uploaded data into multiple data blocks, and uploads the to-be-uploaded data included in each data block to the cloud platform in a concurrent manner. Because the gateway can process multiple data blocks in a concurrent manner, the gateway is able to process mass data. Thus, a same gateway may connect multiple data transmitting devices to the cloud platform, thereby reducing the total number of gateways. The reduction of the total number of gateways makes it convenient to maintain the gateways.

The method and the device provided according to the embodiments of the present invention will be described in detail below with reference to the accompanying drawings.

As shown in FIG. 1, an embodiment of the present invention provides a system for uploading data to a cloud platform, including: a gateway 10, at least one data transmitting device 20 and a cloud platform 30.

The at least one data transmitting device 20 is configured to transmit to-be-uploaded data to the gateway 10.

The gateway 10 is configured to segment the received to-be-uploaded data into at least two data blocks, and upload the to-be-uploaded data included in the at least two segmented data blocks to the cloud platform 30 in a concurrent processing manner.

The cloud platform 30 is configured to receive the to-be-uploaded data uploaded by the gateway 10.

In the system for uploading data to a cloud platform provided according to the embodiment of the present invention, each data transmitting device 20 transmits to-be-uploaded data to the gateway 10, and after segmenting the to-be-uploaded data into multiple data blocks, the gateway 10 transmits the to-be-uploaded data included in each data block to the cloud platform 30 in a concurrent manner. Because the gateway 10 can process each segmented data block in a concurrent manner, the gateway 10 is able to process mass data, so that each data transmitting device 20 may upload to-be-uploaded data to the cloud platform 30 through one gateway. The reduction of the total number of the gateway 10 in the entire system makes it convenient to maintain the gateway 10.

Figure 2:
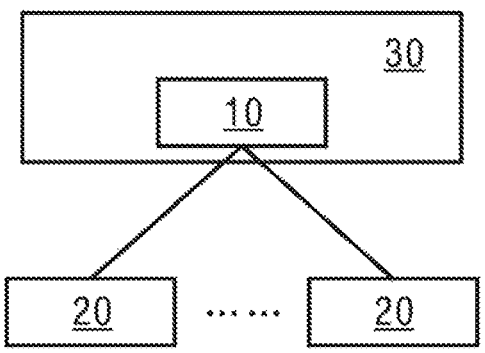
FIG. 2 is a schematic diagram of another system for uploading data to a cloud platform according to an embodiment of the present invention.

Optionally, in an embodiment as shown in FIG. 2, the gateway 10 is disposed on the cloud platform 30. Because the gateway 10 is disposed on the cloud platform 30, a user of the gateway 10 can only control the data transmitting device 20 to transmit data to the gateway 10, but cannot disturb the data processing process of the gateway, so that the safety of uploading data from the gateway to the cloud platform may be improved.

Figure 3:
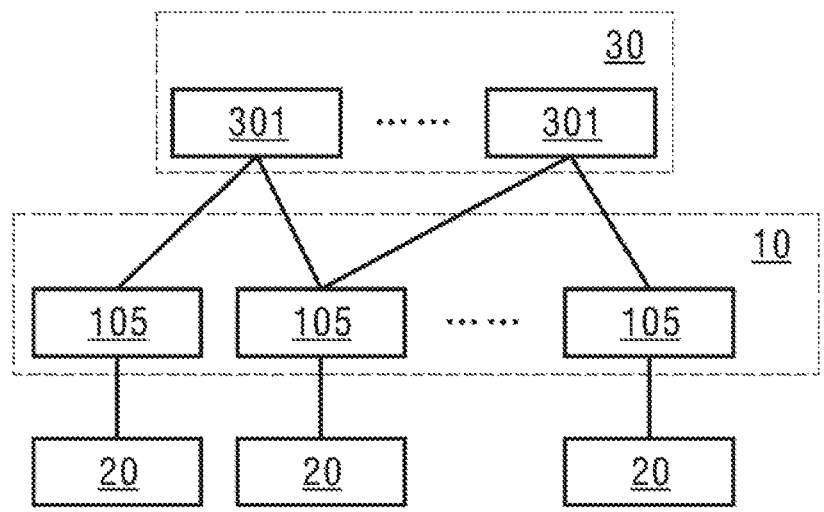
FIG. 3 is a schematic diagram of yet another system for uploading data to a cloud platform according to an embodiment of the present invention.

Optionally, in an embodiment as shown in FIG. 3, the cloud platform 30 includes at least one data subscription module 301, wherein each data subscription module 301 is configured to subscribe data for at least one message queue 105 in the gateway 10, and receive the subscribed to-be-loaded data transmitted by the at least one message queue 105.

The cloud platform 30 is provided with multiple data subscription modules 301, wherein each data subscription module 301 may subscribe data for one or more message queues 105 in the gateway 10, and after receiving to-be-loaded data transmitted by the message queue 105, the data subscription module 301 transmits the received to-be-loaded data to a corresponding data processing module or data storage module on the cloud platform 30, thereby making it convenient for the cloud platform 30 to further process to-be-loaded data.

Methods for uploading data to a cloud platform provided according to an embodiment of the present invention will be introduced below. Unless otherwise stated, a gateway involved in these methods may be the foregoing gateway 10, a data transmitting device involved in these methods may be the foregoing data transmitting device 20, and a cloud platform involved in these methods may be the foregoing cloud platform 30.

Figure 4:
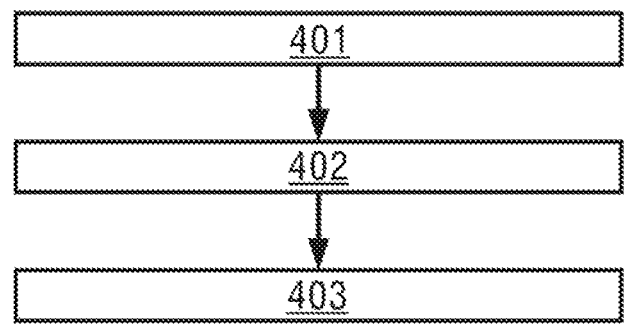
FIG. 4 is a flowchart of a method for uploading data to a cloud platform according to an embodiment of the present invention.

In the method for uploading data to a cloud platform provided according to the embodiment of the present invention, a gateway segments to-be-uploaded data into a data block, then performs concurrent processing, and uploads the to-be-uploaded data to a cloud platform. As shown in FIG. 4, the method may specifically include the following steps:

Step 401: A gateway receives at least two items of to-be-uploaded data from at least one data transmitting device.

Step 402: The gateway segments the at least two items of to-be-uploaded data into at least two data blocks, wherein each data block includes at least one item of to-be-uploaded data.

Step 403: The gateway uploads the to-be-uploaded data included in the at least two data blocks to a cloud platform in a concurrent manner.

The embodiment of the present invention provides a method for uploading data to a cloud platform. After receiving to-be-uploaded data transmitted by each data transmitting device, the gateway segments the received to-be-uploaded data into multiple data blocks, and processes each data block in a concurrent manner, so as to upload the to-be-uploaded data included in each data block to the cloud platform. Because the gateway can process each segmented data block in a concurrent manner, the gateway is able to process mass data, so that each data transmitting device may upload to-be-uploaded data to the cloud platform through one gateway, thereby reducing the number of required gateways. After the number of gateways is reduced, it is convenient to maintain the gateways.

Figure 5:
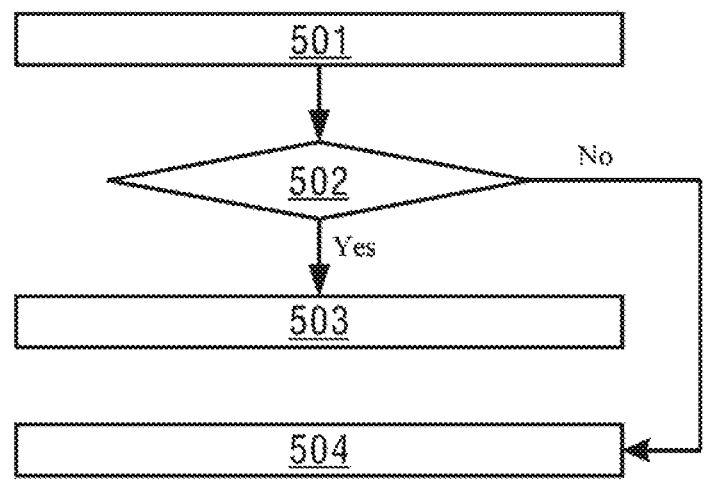
FIG. 5 is a flowchart of a data block segmenting method according to an embodiment of the present invention.

Optionally, in an embodiment, in step 402, the gateway segments each of the received items of to-be-uploaded data into multiple data blocks. As shown in FIG. 5, the step may be specifically implemented through the following substeps:

Step 501: Segment at least one item of to-be-uploaded data received within a same preset segmentation cycle into a first data block according to receiving time for each item of to-be-uploaded data.

Step 502: Detect, for each first data block, whether the capacity of the first data block is greater than a preset capacity threshold, if yes, execute step 503, and otherwise, execute step 504.

Step 503: Segment the first data block into at least two second data blocks so that the capacity of each second data block is smaller than or equal to the capacity threshold, take each second data block as a data block, and end the current flow.

Step 504: Take the first data block as a data block.

A segmentation cycle is preset, and to-be-uploaded data transmitted by each data transmitting device and received within a same segmentation cycle is segmented into a first data block. For example, the length of the preset segmentation cycle is 1 s (second), so the gateway segments to-be-uploaded data received within the previous second into a first data block once a second.

Because each data transmitting device transmits to-be-uploaded data to the gateway at a non-constant speed, the data size of to-be-uploaded data received by the gateway within each segmentation cycle is also non-constant, thereby resulting in that the first data block has different capacities. For example, each data transmitting device within a first segmentation cycle is at a peak hour of usage currently, the capacity of a first data block 1 formed within the first segmentation cycle being 3 MB (MByte); and each data transmitting device within a second segmentation cycle is at an off-peak hour of usage currently, the capacity of a second data block 2 formed within the second segmentation cycle being 1 MB.

Because the gateway processes each data block in a concurrent manner, it is necessary to prevent occurrence of a large-capacity data block in order to ensure the processing synchronism of each data block. Therefore, a capacity threshold is preset, and whether the capacity of each of the segmented first data blocks is greater than the capacity threshold is judged. If yes, the first data block is further segmented into at least two second data blocks to ensure that the capacity of each second data block is smaller than or equal to the capacity threshold, and each of the segmented second data blocks is taken as a data block for subsequent concurrent processing. If no, the first data block is directly taken as a data block for subsequent concurrent processing. For example, a preset capacity threshold is 2 MB. For the first data block 1 of which the capacity is 3 MB, the capacity is greater than the capacity threshold, and it is necessary to segment the first data block 1 into at least two second data blocks having the capacity smaller than or equal to the capacity threshold, so as to take the at least two segmented second data blocks as data blocks for concurrent processing. For the first data block 2 of which the capacity is 1 MB, the capacity is smaller than the capacity threshold, and the first data block 2 may be directly taken as a data block for concurrent processing.

Figure 6:
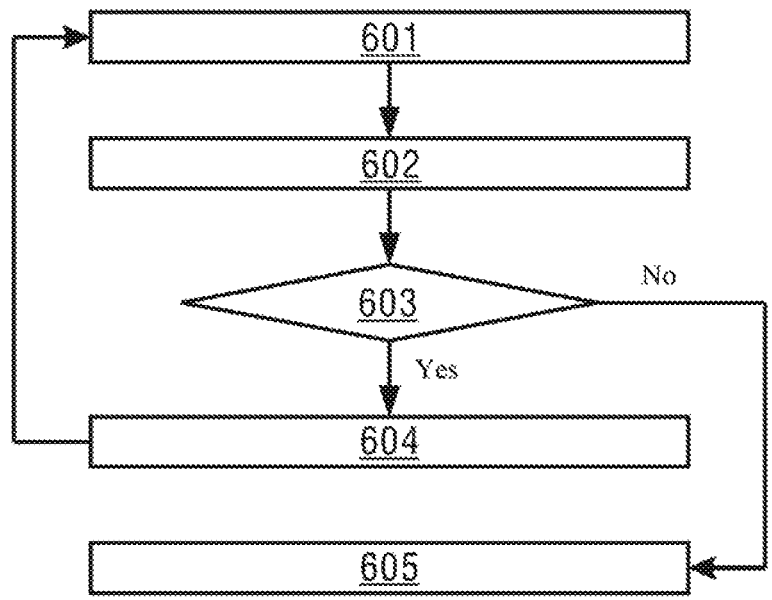
FIG. 6 is a flowchart of a method for segmenting a first data block according to an embodiment of the present invention.

Optionally, in an embodiment, in step 503, the first data block is segmented into at least two second data blocks having the capacity smaller than or equal to the capacity threshold. As shown in FIG. 6, the step may be specifically implemented through the following sub-steps:

Step 601: Divide a segmentation cycle into two successive segmentation sub-cycles equal in time length.

Step 602: Segment to-be-uploaded data received within a same segmentation sub-cycle into a third data block.

Step 603: Detect, for each third data block, whether the capacity of the third data block is greater than the capacity threshold, if yes, execute step 604, and otherwise, execute step 605.

Step 604: Take the segmentation sub-cycle as the segmentation cycle, and execute step 601.

Step 605: Take the third data block as a second data block.

The gateway segments each item of to-be-uploaded data received within a segmentation cycle into a first data block, after the capacity of the first data block is greater than the capacity threshold, the segmentation cycle corresponding to the first data block may be equally divided into two segmentation sub-cycles, and to-be-uploaded data received within each segmentation sub-cycle is segmented into a third data block. If the capacity of the third data block is still greater than the capacity threshold, the segmentation sub-cycle corresponding to the third data block is equally divided as the segmentation cycle again until the capacity of the third data block is smaller than or equal to the capacity threshold, and the third data block is taken as a second data block, so as to avoid affecting the uploading rate for to-be-uploaded data due to the over-large capacity of a data block for concurrent processing.

For example, the segmentation cycle corresponding to the first data block 1 is divided into a segmentation sub-cycle 1 and a segmentation sub-cycle 2, the lengths of both the segmentation sub-cycle 1 and the segmentation sub-cycle 2 being 0.5 s. To-be-uploaded data received within the segmentation sub-cycle 1 is segmented into a third data block 1, and to-be-uploaded data received within the segmentation sub-cycle 2 is segmented into a third data block 2. The capacity of the third data block 1 is 0.5 MB. Because the capacity of the third data block 1 is smaller than a capacity threshold of 2 MB, the third data block 1 is directly taken as a second data block. The capacity of the third data block 2 is 2.5 MB. Because the capacity of the third data block 2 is greater than the capacity threshold of 2 MB, the segmentation sub-cycle 2 is equally divided into a segmentation sub-cycle 3 and a segmentation sub-cycle 4, the lengths of both the segmentation sub-cycle 3 and the segmentation sub-cycle 4 being 0.25 s. To-be-uploaded data received within the segmentation sub-cycle 3 is segmented into a third data block 3, and to-be-uploaded data received within the segmentation sub-cycle 4 is segmented into a third data block 4. The capacity of the third data block 3 is 1 MB, and the capacity of the third data block 4 is 1.5 MB. Because the capacity of the third data block 3 and the capacity of the third data block 4 are both smaller than the capacity threshold of 2 MB, the third data block 3 and the third data block 4 are taken as a second data block separately. Thus, the first data block 1 is segmented into three second data blocks having the capacity smaller than the capacity threshold.

Figure 7:
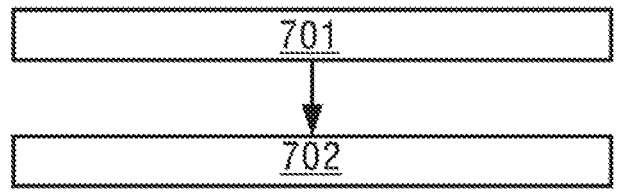
FIG. 7 is a flowchart of another method for uploading data to a cloud platform according to an embodiment of the present invention.

Optionally, in an embodiment, in step 403, the gateway uploads the to-be-uploaded data included in each data block to the cloud platform in a concurrent manner. As shown in FIG. 7, the step may be specifically implemented through the following sub-steps:

Step 701: Pre-create a corresponding message queue for each data transmitting device, wherein the message queue is used for accepting a subscription from at least one data subscription module on the cloud platform, and transmitting the received to-be-uploaded data to each data subscription module subscribing the data.

Step 702: Process at least two data blocks simultaneously in a concurrent manner, acquire, for each item of to-be-uploaded data included in each data block, a device ID carried in the to-be-uploaded data, and transmit the to-beuploaded data to the message queue corresponding to a same data transmitting device as the device ID.

A corresponding message queue is created for each data transmitting device, and the message queue transmits, through a publishing/subscription mechanism, the received to-be-uploaded data to each data subscription module subscribing the data. Therefore, each message queue can upload data to the cloud platform simultaneously to ensure the rate of uploading data from the gateway to the cloud platform, such that the gateway has a prior condition of uploading data transmitted by multiple data transmitting devices to the cloud platform.

After to-be-uploaded data is segmented into multiple data blocks, at least two data blocks are processed simultaneously in a concurrent manner. Each item of to-be-uploaded data carries a corresponding device ID, the device ID being used for identifying the data transmitting device transmitting the to-be-uploaded data. When a data block is processed, each item of to-be-uploaded data included in the data block is transmitted, according to a device ID carried in the to-be-uploaded data, to a message queue corresponding to a same data transmitting device as the carried device ID, such that the message queue uploads the data to the cloud platform. By processing multiple data blocks simultaneously in a concurrent manner, the rate of storing, by the gateway, to-be-uploaded data in each message queue is improved, to-be-uploaded data transmitted by each data transmitting device is stored in the corresponding message queue in time, and the to-be-uploaded data is uploaded to the cloud platform through each message queue in time, such that the gateway is able to process mass data, and a same gateway may be responsible for uploading to-be-uploaded data transmitted by multiple data transmitting devices to the cloud platform.

For example, after to-be-uploaded data is segmented into multiple data blocks, the gateway may process 10 data blocks simultaneously. For any one data block A including five items of to-be-uploaded data, device IDs carried in the five items of to-be-uploaded data included in the data block A are acquired in sequence, wherein both to-be-uploaded data 1 and to-be-uploaded data 2 in the five items of to-be-uploaded data carry a device ID1, both to-be-uploaded data 3 and to-be-uploaded data 4 in the five items of to-be-uploaded data carry a device ID2, and to-be-uploaded data 5 in the five items of to-be-uploaded data carries a device ID3. According to the device IDs carried in the five items of to-be-uploaded data, the to-be-uploaded data 1 and the to-be-uploaded data 2 are transmitted to a message queue 1 corresponding to a data transmitting device 1 identified by the device ID1, the to-be-uploaded data 3 and the to-be-uploaded data 4 are transmitted to a message queue 2 corresponding to a data transmitting device 2 identified by the device ID2, and the to-be-uploaded data 5 is transmitted to a message queue 3 corresponding to a data transmitting device 3 identified by the device ID3. The message queue 1 transmits the to-be-uploaded data 1 and the to-be-uploaded data 2 to each data subscription module subscribing the data, the message queue 2 transmits the to-be-uploaded data 3 and the to-be-uploaded data 4 to each data subscription module subscribing the data, and the message queue 3 transmits the to-be-uploaded data 5 to each data subscription module subscribing the data.

Optionally, in an embodiment, during the process of transmitting to-be-uploaded data to the corresponding message queue according to the device ID carried in the to-be-uploaded data, the usage rate of each message queue is monitored in real time, and after the usage rate of one message queue exceeds a preset usage rate threshold, a message queue corresponding to the same data transmitting device as this message queue is created again. Correspondingly, when to-be-uploaded data is transmitted to a message queue, according to a device ID included in the to-be-uploaded data, the number of message queues corresponding to a same data transmitting device as the device ID is determined first. If there is one message queue, the to-be-uploaded data is transmitted to this message queue. If there are multiple message queues, the to-be-uploaded data is transmitted to one message queue having a lowest usage rate in the various message queues.

The same data transmitting device transmits to-be-uploaded data to the gateway at different rates in different time periods. When the data size of the to-be-uploaded data transmitted to the gateway is larger, the usage rate of the corresponding message queue may be higher. In order to avoid data congestion or data overflow caused by the fact that to-be-uploaded data in a data block cannot be stored due to the over-high usage rate of the message queue, after the usage rate of ibe message queue exceeds a preset usage rate threshold, a message queue corresponding to a same data transmitting device as this message queue is created, so as to relieve the stress on another message queue. Correspondingly, when to-be-uploaded data is transmitted to a message queue, the to-be-uploaded data is transmitted to one message queue having the lowest usage rate.

In addition, when a data transmitting device is corresponding to two or more than two message queues, if the usage rate of each message queue is smaller than a preset minimum usage rate threshold, transmission of to-be-uploaded data to one of the message queues is stopped, and after each item of to-be-uploaded data in this message queue is uploaded to a corresponding data subscription module, this message queue is deleted.

For example, a usage rate threshold is preset as 85%, a message queue 4 is corresponding to a data transmitting device 4, and after the usage rate of the message queue 4 exceeds 85%, a message queue 5 corresponding to the data transmitting device 4 is created again. When to-be-uploaded data carrying the device ID of the data transmitting device 4 reappears in a data block, the to-be-uploaded data is transmitted to the message queue 4 or a message queue 5, having a lower usage rate.

Figure 8:
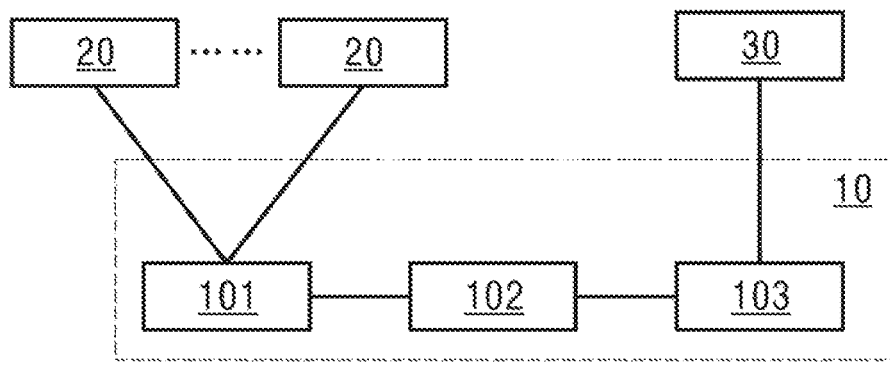
FIG. 8 is a schematic diagram of a gateway according to an embodiment of the present invention.

As shown in FIG. 8, an embodiment of the present invention provides a gateway 10, including:

a data receiving module 101, configured to receive at least two items of to-be-uploaded data from at least one data transmitting device 20;

a data segmenting module 102, configured to segment the at least two items of to-be-uploaded data received by the data receiving module 101 into at least two data blocks, each data block including at least one item of to-be-uploaded data; and a data uploading module 103, configured to upload the to-be-uploaded data included in the at least two data blocks segmented by the data segmenting module 102 to a cloud platform 30 in a concurrent manner.

In the embodiment of the present invention, the data receiving module 101 may be configured to execute step 401 in the foregoing method embodiment, the data segmenting module 102 may be configured to execute step 402 in the foregoing method embodiment, and the data uploading module 103 may be configured to execute step 403 in the foregoing method embodiment.

Figure 9:
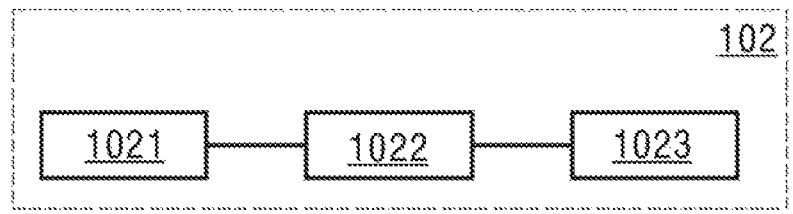
FIG. 9 is a schematic diagram of a data segmenting module according to an embodiment of the present invention.

Optionally, in an embodiment as shown in FIG. 9, the data segmenting module 102 may include:

a first data segmenting unit 1021, configured to segment at least one item of to-be-uploaded data received within a same preset segmentation cycle into a first data block according to receiving time for each item of to-be-uploaded data;

a data capacity detecting unit 1022, configured to detect, for each first data block segmented by the first data segmenting unit, whether the capacity of the first data block is greater than a preset capacity threshold; and a second data segmenting unit 1023, configured to segment, if a detection result of the data capacity detecting unit 1022 is yes, the first data block into at least two second data blocks so that the capacity of each second data block is smaller than or equal to the capacity threshold, and take each second data block as a data block, and take, if no, the first data block as a data block.

In the embodiment of the present invention, the first data segmenting unit 1021 may be configured to execute step 501 in the foregoing method embodiment, the data capacity detecting unit 1022 may be configured to execute step 502 in the foregoing method embodiment, and the second data segmenting unit 1023 may be configured to execute step 503 and step 504 in the foregoing method embodiment.

Optionally, in an embodiment as shown in FIG. 9, the second data segmenting unit 1023 is configured to divide, when the data capacity detecting unit 1022 detects that the capacity of the first data block is greater than the capacity threshold, the segmentation cycle corresponding to the first data block into two successive segmentation sub-cycles equal in time length, segment the to-be-uploaded data received within the same segmentation sub-cycle into a third data block, detect, for each third data block, whether the capacity of the third data block is greater than the capacity threshold, take, if yes, the segmentation sub-cycle as the segmentation cycle to execute the operation of dividing the segmentation cycle into two successive segmentation sub-cycles equal in time length, and take, if no, the third data block as a second data block.

In the embodiment of the present invention, the second data segmenting unit 1023 may be configured to execute step 601 to step 605 in the foregoing method embodiment.

Figure 10:
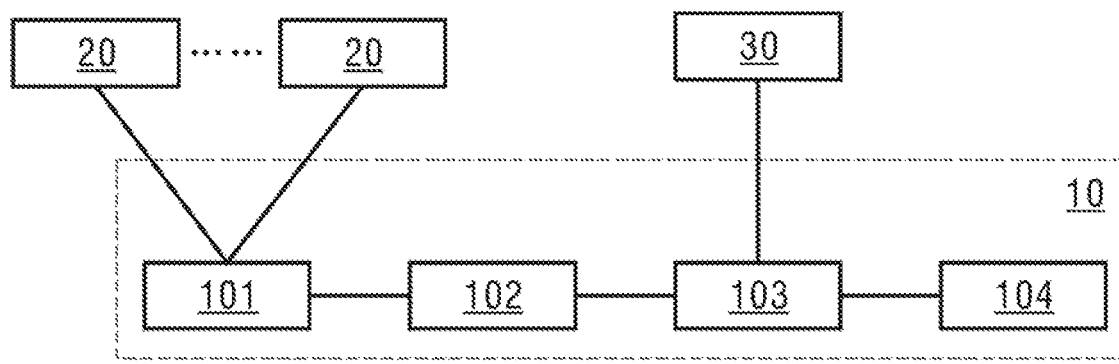
FIG. 10 is a schematic diagram of another gateway according to an embodiment of the present invention.

Optionally, in an embodiment as shown in FIG. 10, the gateway further includes: a creation module 104.

The creation module 104 is configured to pre-create a corresponding message queue 105 for each data transmitting device 20, wherein the message queue 105 is used for accepting a subscription from at least one data subscription module 301 on the cloud platform 30, and transmitting the received to-be-uploaded data to each data subscription module 301 subscribing the data.

The data uploading module 103 is configured to execute, on each data block in the at least two data blocks, the following operation simultaneously in a concurrent manner: acquiring, for each item of to-be-uploaded data included in the data block, a device ID carried in the to-be-uploaded data, and transmitting the to-be-uploaded data to the message queue 105 corresponding to the same data transmitting device 20 as the device ID, the device ID being used for identifying the data transmitting device 20 transmitting the to-be-uploaded data.

In the embodiment of the present invention, the creation module 104 may be configured to execute step 701 in the foregoing method embodiment, and the data uploading module 103 may be configured to execute step 702 in the foregoing method embodiment.

Optionally, in an embodiment as shown in FIG. 10, the creation module 104 is further configured to respectively detect whether the usage rate of each message queue 105 exceeds a preset usage rate threshold, and create, if yes, a message queue 105 corresponding to the same data transmitting device 20 as the present message queue 105.

The data uploading module 103 is configured to judge whether there is one message queue 105 corresponding to the same data transmitting device 20 as the device ID, transmit, if yes, the to-be-uploaded data to the message queue 105 corresponding to the same data transmitting device 20 as the device ID, and transmit, if no, the to-be-uploaded data to one message queue 105 having a lowest usage rate in the various message queues 105 corresponding to the same data transmitting device 20 as the device ID.

Figure 11:
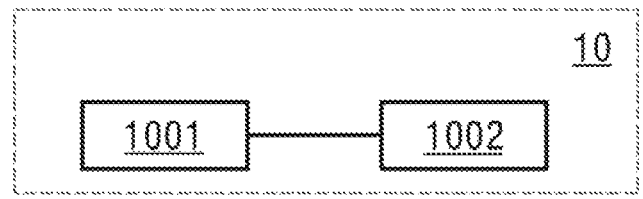
FIG. 11 is a schematic diagram of another gateway according to an embodiment of the present invention.

As shown in FIG. 11, an embodiment of the present invention provides a gateway 10, including: at least one memory 1001 and at least one processor 1002, wherein the at least one memory 1001 is configured to store a machine-readable program; and the at least one processor 1002 is configured to call the machine-readable program stored in the at least one memory 1001 to execute various steps in the foregoing method embodiment.

Figure 12:
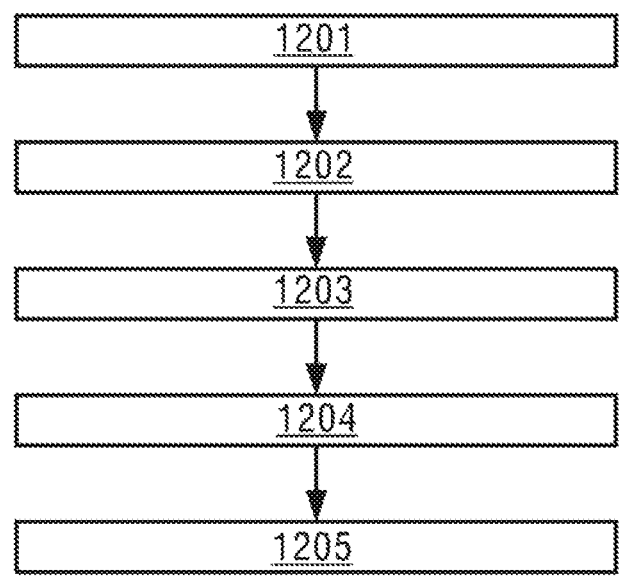
FIG. 12 is a flowchart of yet another method for uploading data to a cloud platform according to an embodiment of the present invention.

The method for uploading data to a cloud platform provided according to the embodiment of the present invention will be described in further detail below in conjunction with the gateway and the system for uploading data to a cloud platform provided according to the foregoing embodiments. As shown in FIG. 12, the method may include the following steps:

Step 1201: A gateway receives to-be-uploaded data transmitted by each data transmitting device.

In an embodiment of the present invention, the gateway disposed on a cloud platform is connected with various data transmitting devices, receives to-be-uploaded data transmitted by each data transmitting device in real time, and caches the received to-be-uploaded data into a caching pool.

Step 1202: The gateway segments the received to-be-uploaded data into multiple data blocks.

In an embodiment of the present invention, the gateway segments, at an interval of a preset segmentation cycle, to-be-uploaded data received within this segmentation cycle into a first data block according to receiving time for each item of to-be-uploaded data. If the capacity of the first data block is smaller than or equal to a preset capacity threshold, the first data block is directly taken as a data block for subsequent processing. If the capacity of the first data block is greater than the preset capacity threshold, the first data block is segmented into multiple second data blocks having the capacity smaller than or equal to the preset capacity threshold in a manner of equally dividing a segmentation cycle, and each second data block is taken as a data block for subsequent processing.

Specifically, when the first data block is segmented, the segmentation cycle corresponding to the first data block is divided into two successive segmentation sub-cycles equal in time length, and to-be-uploaded data received by the gateway within each segmentation sub-cycle is segmented into a third data block. If the capacity of the third data block is smaller than or equal to the preset capacity threshold, the third data block is taken as a second data block, that is, the third data block is taken as a data block for subsequent processing. If the capacity of the third data block is greater than the preset capacity threshold, the third data block is segmented by using the method for segmenting the first data block until the capacity of a data block finally segmented is smaller than or equal to the preset capacity threshold, and the data block finally segmented is taken as a second data block.

Step 1203: The gateway processes multiple data blocks simultaneously in a concurrent manner, and transmits to-be-uploaded data included in the data blocks to corresponding message queues.

In an embodiment of the present invention, the gateway processes multiple data blocks simultaneously in a concurrent manner. For each data block, a device ID carried in each item of to-be-uploaded data included in this data block is acquired, and each item of to-be-uploaded data is transmitted to a corresponding message queue according to the device ID carried in each item of to-be-uploaded data.

Specifically, the gateway pre-creates a corresponding message queue for each data transmitting device, and executes, on each item of to-be-uploaded data included in the data block, the following processing:

acquiring, according to a device ID carried in the to-be-uploaded data, the number of message queues corresponding to a same data transmitting device as the device ID;

if there is one message queue, determining whether the usage rate of this message queue exceeds a preset usage rate threshold, if yes, creating a message queue corresponding to a same data transmitting device as this message queue and transmitting to-be-uploaded data to the message queue created recently, and otherwise, transmitting the to-be-uploaded data to this message queue; and if there are multiple message queues, acquiring a message queue having a lowest usage rate in these message queues, if the usage rate of the message queue having the lowest usage rate also exceeds the preset usage rate threshold, creating a message queue corresponding to a same data transmitting device as these message queues again and transmitting to-be-uploaded data to the message queue created recently, and otherwise, transmitting the to-be-uploaded data to the message queue having the lowest usage rate.

Step 1204: The gateway transmits the to-be-uploaded data to a corresponding data subscription module by using each message queue.

In an embodiment of the present invention, each message queue created by the gateway may accept a subscription from one or more data subscription modules on the cloud platform. For each message queue, after the to-be-uploaded data is received, each of the received items of to-be-uploaded data is transmitted in sequence to each data subscription module subscribing the data.

For example, a message queue A accepts subscriptions from three data subscription modules, and after the message queue A receives to-be-uploaded data, the message queue A transmits the received to-be-uploaded data to the three data subscription modules respectively.

Step 1205: The data subscription module transmits the received to-be-uploaded data to a data processing module on the cloud platform for processing.

In an embodiment of the present invention, each data subscription module on the cloud platform acquires to-be-uploaded data from one or more message queues, and transmits the acquired to-be-uploaded data to a corresponding data processing module on the cloud platform after acquiring the to-be-uploaded data. The data processing module on the cloud platform completes processing of the to-be-uploaded data.

At least one embodiment of the present invention also provides a machine-readable medium, which stores an instruction for enabling a machine to execute the method for uploading data to a cloud platform as described herein.

Specifically, a system or apparatus equipped with a storage medium may be provided. A software program code implementing functions of any one embodiment in the foregoing embodiments is stored in the storage medium. Moreover, a computer (or a CPU or an MPU) of the system or apparatus is enabled to read and execute the program code stored in the storage medium.

In this case, the program code itself read from the storage medium may implement functions of any one embodiment in the foregoing embodiments, and therefore the program code and the storage medium storing the program code constitute a part of the present invention.

A storage medium embodiment for providing the program code includes a floppy disk, a hard disk, a magnetic optical disc, an optical disc (such as CD-ROM, CD-R, CD-RW, DVD-ROM, DVD-RAM, DVD–RW, and DVD+RW), a tape, a non-volatile memory card, and an ROM. Optionally, in an embodiment, the program code may be downloaded from a server computer via a communication network.

Furthermore, it should be clear that an operating system operated on the computer is enabled to complete some or all actual operations not only by executing the program code read by the computer, but also by way of an instruction based on the program code, thereby implementing functions of any one embodiment in the foregoing embodiments.

Furthermore, it is understandable that the program code read from the storage medium is written into a memory disposed in an expansion board inserted into the computer or written into a memory disposed in an expansion unit connected to the computer, and then the instruction based on the program code enables a CPU installed on the expansion board or the expansion unit to execute some or all actual operations, thereby implementing functions of any one embodiment in the foregoing embodiments.

It should be noted that not all steps and modules in each flowchart and each system structure diagram are necessary, and some steps or modules may be ignored according to actual requirements. The execution sequence of all steps is not permanent, and may be adjusted as required. A system structure described in each of the foregoing embodiments may be a physical structure, and also may be a logical structure. That is, some modules may be implemented by a same physical entity, or some modules may be separately implemented by multiple physical entities, or may be jointly implemented by some components in multiple independent devices.

In each of the foregoing embodiments, a hardware unit may be implemented in a mechanical manner or an electrical manner. For example, a hardware unit may include permanent dedicated circuits or logics (such as a dedicated processor, an FPGA or an ASIC) for completing corresponding operations. The hardware unit may also include programmable logics or circuits (such as a general purpose processor or other programmable processors), which may be temporarily set by software to complete corresponding operations. A specific implementation (a mechanical manner, or a dedicated permanent circuit, or a temporarily-set circuit) may be determined based on cost and time considerations.

Embodiments of the present invention is shown and described in detail above in conjunction with the accompanying drawings and the preferred embodiments. However, the present invention is not limited to these disclosed embodiments. Based on the foregoing embodiments, a person skilled in the art may know that code auditing means in different embodiments may be combined to obtain more embodiments of the present invention, and these embodiments also fall within the protection scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for uploading data to a cloud platform, comprising:
   receiving, by a gateway, at least two items of to-be-uploaded data from at least one data transmitting device;
   segmenting, by the gateway, the at least two items of to-be-uploaded data into at least two data blocks, each data block of the at least two data blocks including at least one item of to-be-uploaded data; and
   uploading, by the gateway, the to-be-uploaded data included in the at least two data blocks concurrently to the cloud platform using several message cues,
   wherein the segmenting the at least two items of to-be-uploaded data includes,
      segmenting at least one item of to-be-uploaded data received within a same segmentation cycle into a first data block according to a receiving time for each item of to-be-uploaded data,
      detecting whether a capacity of the first data block is greater than a capacity threshold for each respective first data block,
      segmenting a respective first data block into at least two second data blocks having a capacity less than or equal to the capacity threshold and taking each respective second data block as one data block in response tp the capacity of the respective first data block being greater than the capacity threshold and,
      taking the respective first data block as one data block in response to the capacity of the respective first data block not being greater than the capacity threshold, and
   wherein the segmenting a respective first data block includes,
      dividing a segmentation cycle corresponding to the respective first data block into two successive segmentation sub-cycles in time length,
      segmenting the to-be-uploaded data received within a same segmentation sub-cycle into a third data block,
      detecting whether a capacity of each third data block is greater than the capacity threshold,
      dividing the segmentation cycle into two successive segmentation sub-cycles equal in time length in response to a respective third data block being greater than the capacity threshold, and
      taking the respective third data block as one second data block not being greater than the capacity threshold.

2. The method of claim 1, wherein the uploading the to-be-uploaded data comprises:
   creating a message queue for accepting subscription from at least one data subscription module on the cloud platform for each data transmitting device, and transmitting the to-be-uploaded data to the at least one data subscription module;
   acquiring a device ID identifying the data transmitting device transmitting the to-be-uploaded data from the to-be-uploaded data; and
   transmitting the to-be-uploaded data to the message queue corresponding to the data transmitting device identified by the device ID,
   wherein the acquiring the device ID and the transmitting the to-be-uploaded data concur concurrently.

3. The method of claim 2, further comprising:
   detecting whether a usage rate of each respective message queue exceeds a usage rate threshold, and creating a message queue corresponding to the data transmitting device as a present respective message queue in response to the usage rate of the respective message queue exceeding the usage rate threshold, wherein
   the transmitting the to-be-uploaded data includes,
      determining whether there is one message queue corresponding to the data transmitting device identified by the device ID;
      transmitting the to-be-uploaded data to the message queue corresponding to the data transmitting device identified by the device ID based on a determination that there is one message queue corresponding to the data transmitting device identified by the device ID, and
      transmitting the to-be-uploaded data to the one message queue including a relatively lowest usage rate among various message queues corresponding to the data transmitting device identified by the device ID based on a determination that there is not one message queue corresponding to the data transmitting device identified by the device ID.

4. A gateway, comprising:
   at least one memory storing a machine-readable program; and
   at least one processor, wherein the at least one memory, the machine-readable program, and the at least one processor are configured to cause the gateway to,
      receive at least two items of to-be-uploaded data from at least one data transmitting device, segment the at least two items of to-be-uploaded data into at least two data blocks by,
  segmenting at least one item to-be-uploaded data received within a same segmentation cycle into a first data block according to a receiving time for each item to-be-uploaded data,
  detecting whether a capacity of the first data block is greater than a capacity threshold for each respective first data block,
  segmenting a respective first data block into at least two second data blocks having a capacity less than or equal to the capacity threshold and taking each respective second data block as one data block in response to the capacity of the respective first data block being greater than the capacity threshold,
  wherein each data block of the at least two data blocks includes at least one item of to-be-uploaded data, and
  wherein the segmenting the respective first data block includes,
    dividing a segmentation cycle corresponding to the respective first data block into two successive segmentation sub-cycles equal in time length,
    segmenting the to-be-uploaded data received within a same segmentation sub-cycle into a third data block,
    detecting whether a capacity of each third data block is greater than the capacity threshold,
    dividing the segmentation cycle into two successive segmentation sub-cycles equal in time length in response to a respective third data block being greater than the capacity threshold,
    taking the respective third data block as one second data block in response to the capacity of the respective third data block not being greater than the capacity threshold, and
    taking the respective first data block as one data block in response to the capacity of the respective first data block not being greater than the capacity threshold, and
  upload the to-be-uploaded data included in the at least two data blocks concurrently to a cloud platform using several message queues.

5. The gateway of claim 4, wherein the at least one memory the machine-readable program, and the at least one processor are configured to cause the gateway to:
  create a message queue for accepting a subscription from at least one data subscription module on the cloud platform for each data transmitting device and transmit the received to-be-uploaded data to the at least one data subscription module;
  acquire a device ID identifying the data transmitting device transmitting to the to-be-uploaded data from the to-be-uploaded data; and
  transmit the to-be-uploaded data to the message queue corresponding to the data transmitting device identified by the device ID,
  wherein the at least one memory, the machine-readable program, and the at least one processor are further configured to cause the gateway to acquire the device ID and transmit to the to-be-uploaded data concurrently.

6. The gateway of claim 5, wherein the at least one memory, the machine-readable program, and the least one processor are further configured to cause the gateway to:
  detect whether a usage rate of each respective message queue exceeds a usage rate threshold, and create a message queue corresponding to the data transmitting device as a present respective message que in response to the usage rate of the respective message queue exceeding the usage rate threshold; and
  transmit the to-be-uploaded data by,
    determining whether there is one message queue corresponding to the data transmitting device identified by the device ID,
    transmitting the to-be-uploaded data to the message queue corresponding to the data transmitting device by the device identified by the device ID based on a determination that there is one message queue corresponding to the data transmitting device identified by the device ID, and
    transmitting the to-be-uploaded data to the one message queue including a relatively lowest usage rate among various message queues corresponding to the data transmitting device identified by the device ID based on a determination that there is not one message queue corresponding to the data transmitting device identified by the device ID.

7. A non-transitory machine-readable storage medium storing instruction that, when executed by a processor at a gateway, cause the gateway to perform a method for uploading data to a cloud platform, the method comprising:
  receiving at least two items of to-be-uploaded data from at least one data transmitting device;
  segmenting the at least two items of to-be-uploaded data into at least two data blocks, each data block of the at least two data blocks including at least one item of to-be-uploaded data; and
  uploading the to-be-uploaded data included in the at least two data blocks concurrently to the cloud platform using several message queues,
  wherein the segmenting the at least two items of to-be-uploaded data includes,
    segmenting at least one item of to-be-uploaded data received within a same segmentation cycle into a first data block according to a receiving time for each item of to-be-uploaded data,
    detecting whether a capacity of the first data block is greater than a capacity threshold for each respective first data block,
    segmenting a respective first data block into at least two second data blocks having a capacity less than or equal to the capacity threshold and taking each respective second data block as one data block in response to the capacity of the respective first data block being greater than the capacity threshold, and
    taking the respective first data block as one data block in response to the capacity of the respective first data block not bring greater than the capacity threshold, and
  wherein the segmenting a respective first data block includes,
    dividing a segmentation cycle corresponding to the respective first data block into two successive segmentation sub-cycles equal in time length,
    segmenting the to-be-uploaded data received within a same segmentation sub-cycle into a third data block,
    detecting whether a capacity of each third data block is greater than the capacity threshold,
    dividing the segmentation cycle into two successive segmentation sub-cycles equal in time length in response to a respective third data block being greater than the capacity threshold, and taking the respective third data block as one second data block in response to the capacity of the respective third data block not being greater than the capacity threshold.

8. The non-transitory machine-readable storage medium of claim 7, wherein the method further comprises:

creating a message queue for accepting a subscription from at least one data subscription module on the cloud platform for each data transmitting device, and transmitting the received to-be-uploaded data to the at least one data subscription module;

executing, on each data block in the at least two data blocks, the following operations simultaneously in a concurrent manner:

acquiring a device ID identifying the data transmitting device transmitting the to-be-uploaded data from the to-be-uploaded data; and transmitting the to-be-uploaded data to the message queue corresponding to the data transmitting device identified by the device ID wherein the acquiring the device ID and the transmitting the to-be-uploaded data occur concurrently.

9. The non-transitory machine-readable storage medium of claim 8, wherein the method further comprises:

detecting whether a usage rate of each respective message queue exceeds a usage rate threshold, and creating a message queue corresponding to the data transmitting device as a present respective message queue in response to the usage rate of the respective message queue exceeding the usage rate threshold, wherein the transmitting the to-be-uploaded data includes, determining whether there is one message queue corresponding to the data transmitting device identified by the device ID, transmitting the to-be-uploaded data to the message queue corresponding to the data transmitting device identified by the device ID based on a determination that there is one message queue corresponding to the data transmitting device identified by the device ID, and transmitting the to-be-uploaded data to the one message queue including a relatively lowest usage rate among various message queues corresponding to the data transmitting device identified by the device ID based on a determination that there is not one message queue corresponding to the data transmitting device identified by the device ID.

* * * * *